(12) United States Patent
Wang et al.

(10) Patent No.: US 12,443,378 B2
(45) Date of Patent: Oct. 14, 2025

(54) METHOD AND ELECTRONIC DEVICE OF DISPLAYING IMAGES AND GENERATING DYNAMIC EFFECTS

(71) Applicant: BEIJING BYTEDANCE NETWORK TECHNOLOGY CO., LTD., Beijing (CN)

(72) Inventors: Yingke Wang, Beijing (CN); Hui Zhang, Beijing (CN); Ye Lin, Beijing (CN); Wenjing Liu, Beijing (CN); Chenxuan Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/089,482

(22) Filed: Dec. 27, 2022

(65) Prior Publication Data

US 2023/0137461 A1 May 4, 2023

Related U.S. Application Data

(63) Continuation of application No. PCT/CN2022/082682, filed on Mar. 24, 2022.

(30) Foreign Application Priority Data

Apr. 22, 2021 (CN) .......................... 202110435841.5

(51) Int. Cl.
*G06F 3/14* (2006.01)
*G06T 7/11* (2017.01)
*G06T 11/60* (2006.01)

(52) U.S. Cl.
CPC .................. *G06F 3/14* (2013.01); *G06T 7/11* (2017.01); *G06T 11/60* (2013.01)

(58) Field of Classification Search
CPC .... G06F 3/14; G06F 3/04886; G06F 3/04842; G06F 3/04845; G06T 7/11; G06T 11/60
See application file for complete search history.

(56) References Cited

U.S. PATENT DOCUMENTS

| 2016/0026658 A1 | 1/2016 | Krishnaraj et al. |
| 2016/0125629 A1* | 5/2016 | Shah ....................... G06T 11/20 345/627 |

(Continued)

FOREIGN PATENT DOCUMENTS

| CN | 104574466 A | 4/2015 |
| CN | 106021542 A | 10/2016 |

(Continued)

OTHER PUBLICATIONS

International Patent Application No. PCT/CN2022/082682; Int'l Search Report; dated Jun. 1, 2022; 3 pages.

(Continued)

*Primary Examiner* — David D Davis
(74) *Attorney, Agent, or Firm* — BakerHostetler

(57) ABSTRACT

An interaction method, an interaction apparatus, an electronic device, and a non-volatile computer readable storage medium, the interaction method including: displaying M images, M being a positive integer (S101); in response to detecting that a first trigger condition is satisfied, displaying a first image in M*N regions, the M*N regions corresponding on a one-to-one basis with M*N images, the M*N images comprising images formed by dividing each image amongst the M images into N parts, and N being a positive integer greater than 1 (S102); in response to detecting a trigger operation in N regions amongst the M*N regions, displaying in the N regions N images corresponding on a one-to-one basis with the N regions (S103); and, when a (Continued)

second image amongst the M images comprises N images, generating first prompt information (S104).

16 Claims, 4 Drawing Sheets

(56) References Cited

U.S. PATENT DOCUMENTS

2019/0163349 A1 5/2019 Derner et al.
2020/0356234 A1 11/2020 Song

FOREIGN PATENT DOCUMENTS

| CN | 106713993 | A | | 5/2017 | | |
|---|---|---|---|---|---|---|
| CN | 106730837 | A | * | 5/2017 | ............. | A63F 13/55 |
| CN | 107368566 | A | | 11/2017 | | |
| CN | 111352507 | A | | 6/2020 | | |
| CN | 112007359 | A | * | 12/2020 | | |
| CN | 113138707 | A | * | 7/2021 | ......... | G06F 3/04842 |
| FR | 3033657 | A1 | * | 9/2016 | ......... | G06F 3/04845 |
| JP | H10-133563 | A | | 5/1998 | | |
| JP | 3118091 | U | | 1/2006 | | |
| WO | WO 2020/238874 | A1 | | 12/2020 | | |

OTHER PUBLICATIONS

European Patent Application No. 22790788.8; Supplementary Search Report; dated Dec. 7, 2023; 6 pages.
Japan Patent Application No. 2023-504721; Notice of Reasons for Refusal; dated Jul. 30, 2024; 8 pages.
Written Opinion for International Application No. PCT/CN2022/082682, mailed Jun. 1, 2022, 8 Pages.

* cited by examiner

METHOD AND ELECTRONIC DEVICE OF DISPLAYING IMAGES AND GENERATING DYNAMIC EFFECTS

CROSS-REFERENCE TO RELATED APPLICATIONS

The present disclosure is a continuation of International Patent Application No. PCT/CN2022/082682, filed on Mar. 24, 2022, which is based on and claims priority of Chinese application for invention No. 202110435841.5, filed on Apr. 22, 2021, the disclosure of which is hereby incorporated into this disclosure by reference in its entirety.

TECHNICAL FIELD

The present disclosure relates to the technical field of interactive display, and in particular, to an interaction method, an apparatus, an electronic device and a nonvolatile computer-readable storage medium.

BACKGROUND

With the development of computer interaction technology and multimedia data processing technology, users can browse various multimedia contents, such as various images, by operating terminal devices.

SUMMARY

This summary is provided for a concise introduction of the inventive concept of the present application, which will be described in detail in the Detailed Description below. This summary is not intended to identify critical features or essential features of the claimed technical solution, nor is it intended to be used to limit the scope of the claimed technical solution.

In a first aspect, an embodiment of the present disclosure provides an interaction method, comprising: displaying M images, wherein M is a positive integer; in response to the detection that a first trigger condition is met, displaying first images in M×N regions, wherein the M×N regions have one-to-one correspondence with M×N images, the M×N images comprises images formed by dividing each of M images into N pieces, And N is a positive integer greater than 1; in response to the detection of trigger operations in N regions of the M×N regions, displaying, in the N regions, N images that have one-to-one correspondence with the N regions; generating first prompt information, in a case where a second image of the M images comprises the N images.

In some embodiments, the first trigger condition comprises displaying the M images for a first preset duration; or the first trigger condition comprises a trigger operation occurred in a first preset region.

In some embodiments, before displaying the M images, the method further comprises: displaying Q images, wherein Q is a positive integer greater than M; displaying M images comprises: determining the M images from the Q images in response to the detection that a second trigger condition is met, and displaying the M images.

In some embodiments, the second trigger condition comprises displaying the Q images for a second preset duration; or the second trigger condition comprises a trigger operation occurred in a second preset region.

In some embodiments, determining the M images from the Q images and displaying the M images comprises: determining the M images from the Q images in a random manner and displaying the M images with a first special effect.

In some embodiments, in response to the detection of trigger operations in N regions of the M×N regions, displaying, in the N regions, N images that have one-to-one correspondence with the N regions comprises: each time a trigger operation is detected in one of the N regions, displaying, in the region, an image corresponding to the region.

In some embodiments, displaying, in the N regions, N images that have one-to-one correspondence with the N regions comprises: replacing the first images displayed in the N regions with the N images that have one-to-one correspondence with the N regions and displaying the N images.

In some embodiments, if the second image of the M images comprises the N images, the method further comprises: displaying, in regions other than the N regions of the M×N regions, images that have one-to-one correspondence with these regions.

In a second aspect, an embodiment of the present disclosure provides an interaction apparatus, comprising a display module and a prompt information generation module, characterized in: the display module used for displaying M images, wherein M is a positive integer; the display module further used for, in response to the detection that a first trigger condition is met, displaying first images in M×N regions, wherein the M×N regions have one-to-one correspondence with M×N images, the M×N images comprises images formed by dividing each of M images into N pieces, And N is a positive integer greater than 1; the display module further used for, in response to the detection of trigger operations in N regions of the M×N regions, displaying, in the N regions, N images that have one-to-one correspondence with the N regions; the prompt information generation module used for generating first prompt information, in a case where a second image of the M images comprises the N images.

In some embodiments, the first trigger condition comprises displaying the M images for a first preset duration; or the first trigger condition comprises a trigger operation occurred in a first preset region.

In some embodiments, the display module is further used for displaying Q images, wherein Q is a positive integer greater than M; displaying M images comprises: determining the M images from the Q images in response to the detection that a second trigger condition is met, and displaying the M images.

In some embodiments, the second trigger condition comprises displaying the Q images for a second preset duration; or the second trigger condition comprises a trigger operation occurred in a second preset region.

In some embodiments, determining the M images from the Q images and displaying the M images comprises: determining the M images from the Q images in a random manner and displaying the M images with a first special effect.

In some embodiments, in response to the detection of trigger operations in N regions of the M×N regions, displaying, in the N regions, N images that have one-to-one correspondence with the N regions comprises: each time a trigger operation is detected in one of the N regions, displaying, in the region, an image corresponding to the region.

In some embodiments, displaying, in the N regions, N images that have one-to-one correspondence with the N regions comprises: replacing the first images displayed in the N regions with N images that have one-to-one correspondence with the N regions and displaying the N images.

In some embodiments, the display module is further used for, if a second image in the M images comprises the N images, displaying, in regions other than the N regions of the M×N regions, images that have one-to-one correspondence with these regions.

In a third aspect, an embodiment of the present disclosure provides an interaction method, comprising: displaying M images, wherein M is a positive integer; displaying first images in M×N regions, in response to a detection that a first trigger condition is met, wherein the M×N regions have one-to-one correspondence with M×N images, the M×N images comprises images formed by dividing each of M images into N pieces, and N is a positive integer greater than 1; displaying, in L regions of the M×N regions, L images that have one-to-one correspondence with the L regions, in response to a detection of trigger operations in the L regions, wherein L is greater than or equal to N; and generating first prompt information, in a case where N images of the L images form a second image of the M images.

In a fourth aspect, an embodiment of the present disclosure provides an electronic device, comprising:

memory for storing computer-readable instructions; and
a processor configured to execute the computer-readable instructions, to cause the electronic device to implement the method according to any embodiment above.

In a fifth aspect, an embodiment of the present disclosure provides a non-transitory computer-readable storage medium on which computer-readable instructions are stored, which when executed by a computer cause the computer to implement the method according to any embodiment above.

In a sixth aspect, an embodiment of the present disclosure provides a computer program, comprising: instructions that, when executed by a processor, cause the processor to implement the interaction method of any embodiment above.

In a seventh aspect, an embodiment of the present disclosure provides a computer product comprising instructions that, when executed by a processor, cause the processor to implement the interaction method of any embodiment above.

The above description is only an overview of the technical solution in this disclosure. In order to understand the technical means of this disclosure more clearly, it can be implemented in accordance with the content of this specification, and in order to make the above and other objects, features, and advantages of the present disclosure more comprehensible, specific embodiments of the present disclosure are given below.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

As mentioned above, the form of displaying images based on user's input and output operations is relatively conventional and single, which has a technical problem of poor user experience.

In order to solve the above technical problem and improve user experience, the embodiments of the present disclosure propose the following technical solution.

Figure 1:
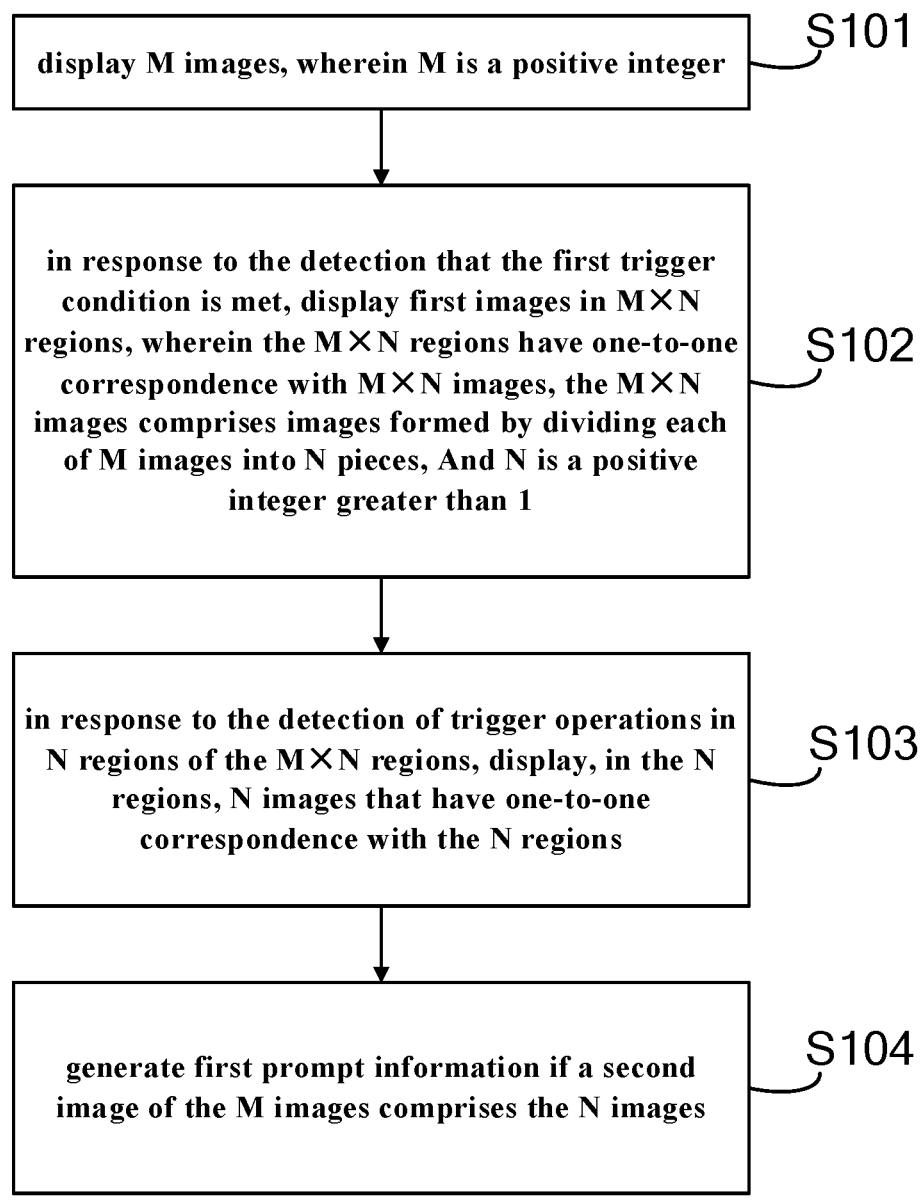
FIG. 1 is a flowchart of an interaction method provided by some embodiments of the present disclosure.

FIG. 1 is a flowchart of the interaction method provided by some embodiments of the present disclosure. In some embodiments, the interaction method provided can be executed by an interaction apparatus. The interaction apparatus may be implemented as software or a combination of software and hardware. The interaction apparatus can be integrated in a certain device of an interaction system, such as a terminal device. As shown in FIG. 1, the method comprises the following steps.

Step S101: displaying M images, wherein M is a positive integer.

In step S101, for example, an interaction interface can be displayed on the screen of the terminal device. The interaction interface can fill the screen or occupy part of the screen.

M images are displayed on the interaction interface, wherein M is a positive integer, for example, M equals 4 or 8. The M images can be displayed in one row. For example, in case that M=4, the 4 images are displayed in one row. The M images can also be displayed in two rows. For example, in case that M=8, 4 images are displayed in each row.

Step S102: in response to the detection that the first trigger condition is met, displaying first images in M×N regions, wherein the M×N regions have one-to-one correspondence with M×N images, the M×N images comprises images formed by dividing each of M images into N pieces, And N is a positive integer greater than 1.

In step S102, the terminal device displays the first images in M×N regions in response to detecting that the first trigger condition is met. In some embodiments, the first images may be images different from the M images.

As an example, for example, M=4, N=2, in step S102, the terminal device displays the first images in 8 regions (4×2) in response to detecting that the first trigger condition is met. The first images can be the same image. In this case, the same image is displayed in each of the 8 regions. The first images may comprise a plurality of different images. In this case, the plurality of different images are displayed in the 8 regions, respectively.

Exemplary, the first images comprise 8 different images, and the 8 different images can be displayed in the 8 regions respectively; Exemplary, the first images comprise 2 different images, wherein one of the 2 different images can be displayed in 4 regions of the 8 regions, and the other one of the 2 different images can be displayed in the other 4 regions.

The M×N regions can be arranged in any form, such as multiple rows, a circle, a square, etc., which is not limited in the embodiments of the present disclosure.

The M×N regions have one-to-one correspondence with M×N images. The M×N images comprise images formed by dividing each of the M images into N pieces, and N is a positive integer greater than 1.

For example, M=4, N=2, so there are 8 regions (4×2) and these 8 regions have one-to-one correspondence with 8 images. The 8 images comprise 8 images formed by dividing each of the 4 images (M=4) in step S101 into 2 pieces (N=2).

For example, each of the 4 images in step S101 is divided into upper and lower pieces, so that each of the 4 images in step S101 is divided into 2 parts, so as to form the 8 images that have one-to-one correspondence with the 8 regions.

Those skilled in the art can understand that an image can be divided into N pieces in different ways to form N images. For example, if N=3, an image can be divided into 3 pieces by rays emitted every 120 degrees from the central point of the image; For another example, if N=4, an image can be divided into 4 pieces along mutually perpendicular x and y axes with the central point of an image as the origin. The way of dividing an image into N pieces is not limited in the embodiments of the present disclosure.

It should be noted that the one-to-one correspondence between the M×N regions and M×N images can be determined in any feasible way. The correspondence can be determined randomly or in a preset way, which is not limited in the embodiments of the present application.

In some embodiments, the first trigger condition comprises displaying the M images for a first preset duration; or the first trigger condition comprises a trigger operation occurred in a first preset region.

For example, for the M images displayed in step S101, in step S102, the terminal device displays the first images in the M×N regions in response to a displaying duration of the M images that has reached a first preset time length, such as 5 seconds.

For example, in step S102, the terminal device displays the first images in the M×N regions in response to the detection of a trigger operation occurred in a first preset region. For example, if a control is displayed in a first preset region of the interaction interface of the terminal device, and is triggered by a user operating the terminal device, the terminal device can detect that a trigger operation occurs in the first preset region corresponding to the control, and display the first images in the M×N regions.

Step S103: in response to the detection of trigger operations in N regions of the M×N regions, displaying, in the N regions, N images that have one-to-one correspondence with the N regions.

The M×N regions have one-to-one correspondence with the M×N images, so the N regions of the M×N regions also have one-to-one correspondence with N images of the M×N images. Therefore, in step S103, in response to the detection of trigger operations in N regions of the M×N regions, the terminal device displays, in the N regions, N images that have one-to-one correspondence with the N regions.

For example, M=4, N=2, so there are 8 regions (4×2) and these 8 regions have one-to-one correspondence with 8 images. The 8 images comprise 8 images formed by dividing each of the 4 images (M=4) in step S101 into 2 pieces (N=2). When the terminal device detects trigger operations in 2 regions of the eight regions, 2 images of the 8 images that have one-to-one correspondence with the 2 regions are displayed in the 2 regions.

In some embodiments, in response to the detection of trigger operations in N regions of the M×N regions, displaying, in the N regions, N images that have one-to-one correspondence with the N regions comprises: each time a trigger operation is detected in one of the N regions, displaying, in the region, an image corresponding to the region. According to the above example of M=4, N=2, if the terminal device detects a trigger operation in a first region of the 8 regions, it displays, in the first region, an image corresponding to the first region; if the terminal device detects a trigger operation in a second region of the 8 regions, it displays an image, in the second region, corresponding to the second region.

In some embodiments, displaying, in the N regions, N images that have one-to-one correspondence with the N regions comprises: replacing the first images displayed in the N regions with the N images that have one-to-one correspondence with the N regions and displaying the N images. Since the first images are displayed in M×N regions in step S102, in step S103, in a case that N images that have one-to-one correspondence with the N regions need to be displayed in the N regions, the first images displayed in the N regions can be replaced by the N images that have one-to-one correspondence with the N regions Step S104: generating first prompt information, in a case where a second image of the M images comprises the N images.

In step S104, if the terminal device determines that a second image of the M images comprises the N images, it generates first prompt information. Since the M×N images are formed by dividing each of the M images in step S101 into N pieces, that is to say, the M×N images comprise N images formed by dividing a second image of the M images into N pieces. In step S104, if the terminal device determines that the second image comprises N images displayed in step S103, it can be considered that the N images displayed in step S103 are N images formed by dividing the second image into N pieces, and thereby the terminal device generates the first prompt information.

In some embodiments, the first prompt information prompts that the N images are images formed by dividing the second image into N pieces, or the first prompt information shows that the N images can be merged into the second image.

In some embodiments, the first prompt information comprises text information, for example, the text information shows that the N images can be merged into the second image; or the first prompt information can be dynamic information, for example, a dynamic effect of combining the N images to form the second image, which suggests that the N images can be merged into the second image.

In some embodiments, if the second image of the M images comprises the N images, the method further comprises: displaying, in regions other than the N regions of the M×N regions, images that have one-to-one correspondence with these regions.

That is to say, if the terminal device determines that the second image of the M images comprises the N images, it may further displays, in regions other than the N regions of the M×N regions, images that have one-to-one correspondence with these regions.

As mentioned above, there is one-to-one correspondence between the M×N regions and the M×N images. In step S103, in response to trigger operations detected in N regions of the M×N regions, the terminal device displays, in the N regions, N images that have one-to-one correspondence with the N regions. For regions other than the N regions, the terminal device can display images that have one-to-one correspondence with these regions, so that the user operating the terminal device can see which image of the M×N images corresponds to each of the M×N regions.

In the way provided by the embodiments of the present disclosure, the user operating the terminal device can display multiple images through the terminal device, and can interact with the terminal device based on trigger operations, so as to browse the images quickly and conveniently. Therefore, use experience can be improved.

In some embodiments, in step S101, before displaying M images, the method further comprises: displaying Q images, wherein Q is a positive integer greater than M; displaying M images comprises: determining the M images from the Q images in response to the detection that a second trigger condition is met, and displaying the M images.

In some embodiments, the second trigger condition comprises displaying the Q images for a second preset duration; or the second trigger condition comprises a trigger operation occurred in a second preset region.

For example, Q=8, M=4, in step S101, before displaying the M images, the Q images, i.e., 8 images, can be displayed in any arrangement. For example, if Q=8, the 8 images can be arranged in two rows, with 4 images displayed in each row.

Correspondingly, displaying M images comprises: determining the M images from the Q images in response to the detection that a second trigger condition is met, and displaying the M images. The M images can be determined, and then displayed, from the Q images randomly or in a preset way. For example, in the case of Q=8 and M=4 above, 4 images can be determined from the 8 images and displayed in a random manner. For example, the M images can be displayed with a first special effect. For example, 4 images are randomly determined from the 8 images, and the determined 4 images are displayed with a halo effect.

In some embodiments, the second trigger condition comprises displaying the Q images for a second preset duration; or the second trigger condition comprises a trigger operation occurred in a second preset region. For example, for the Q displayed images, in response to a display duration of the Q images that has reached a second preset time length, such as 5 seconds, the terminal device determines the M images from the Q images and displays the M images.

For another example, the terminal device determines the M images from the Q images and displays the M images in response to the detection of a trigger operation occurred in a second preset region. For example, a control is displayed in the second preset region of the interaction interface of the terminal device, which can be triggered by a user who operates the terminal device. Then, the terminal device determines the M images from the Q images and displays the M images in response to the detection of a trigger operation occurred in a second preset region corresponding to the control.

Embodiments of the present disclosure provide an interaction method, a device, an electronic device and a non-volatile computer-readable storage medium. The interaction method comprises: displaying M images, wherein M is a positive integer; in response to the detection that a first trigger condition is met, displaying first images in M×N regions, wherein the M×N regions have one-to-one correspondence with M×N images, the M×N images comprises images formed by dividing each of M images into N pieces, And N is a positive integer greater than 1; in response to the detection of trigger operations in N regions of the M×N regions, displaying, in the N regions, N images that have one-to-one correspondence with the N regions; generating first prompt information if a second image in the M images comprises the N images. Through the above method, users can easily and quickly browse images based on a trigger operation, thereby use experience can be improved.

Figure 2A:
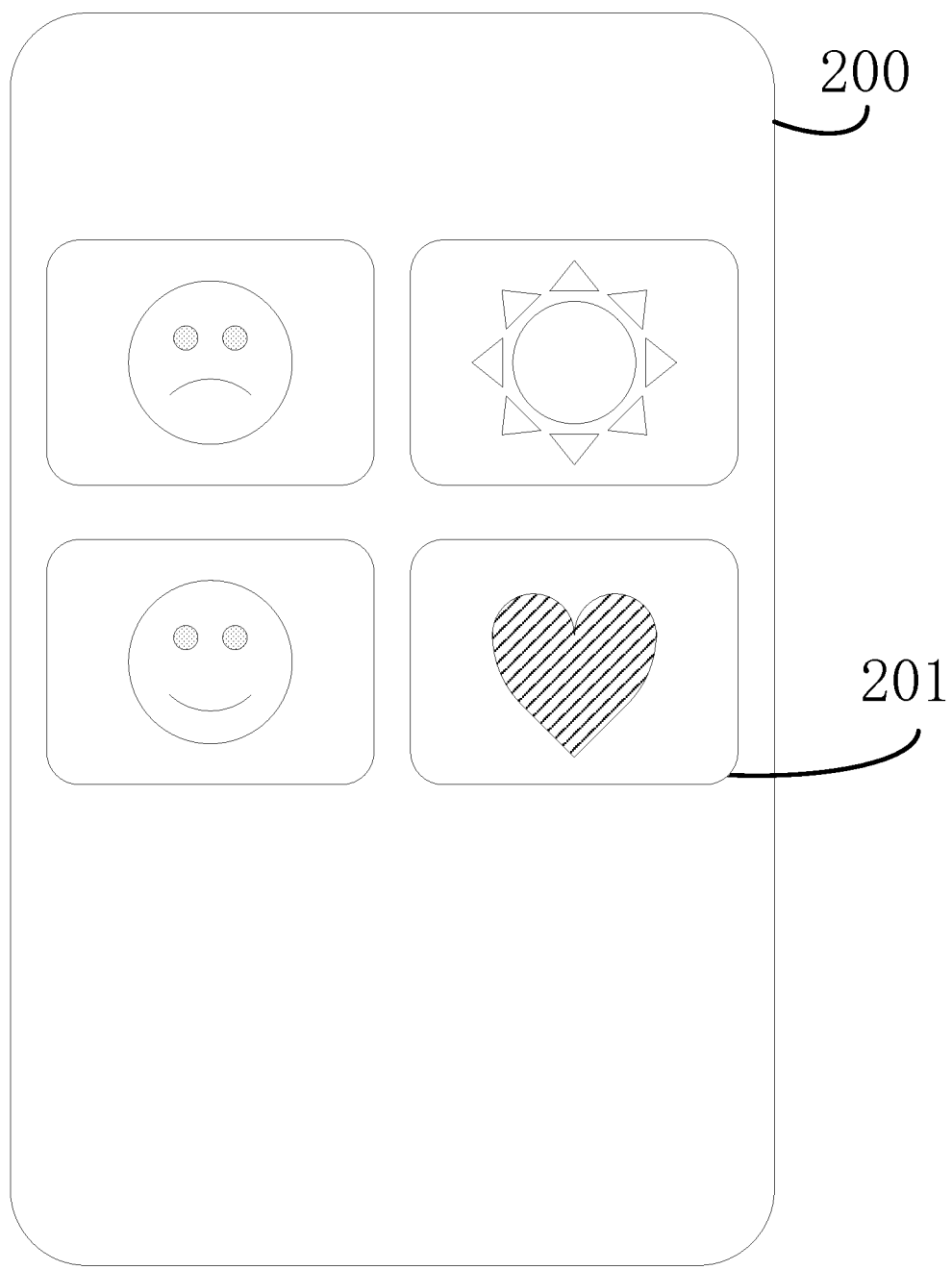
FIGS. 2A to 2C are schematic diagrams of interaction interfaces provided by some embodiments of the present disclosure.
Figure 2B:
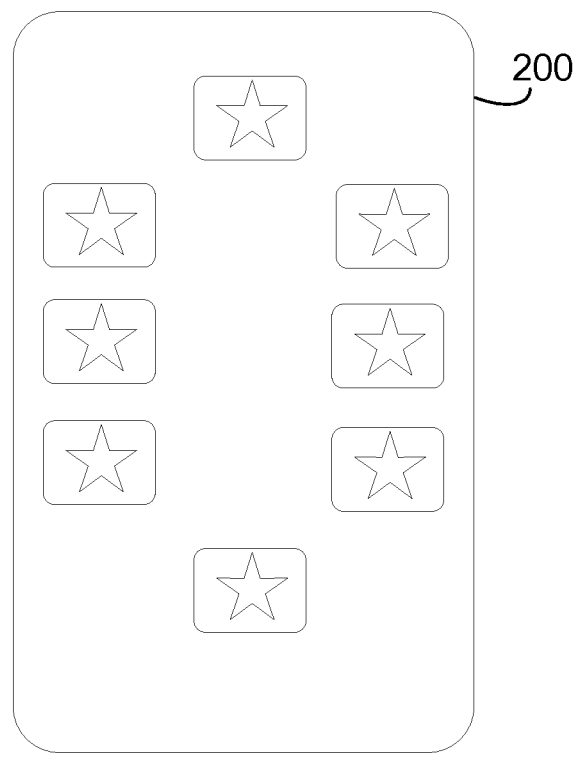
Figure 2C:
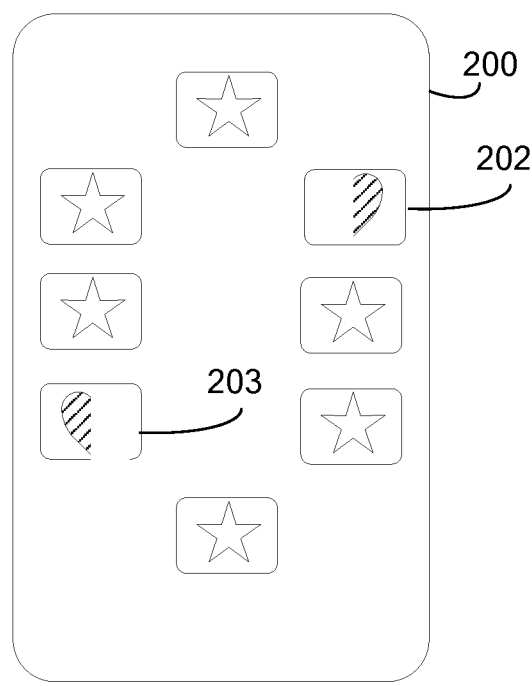

FIGS. 2A, 2B, and 2C show interaction interfaces of some embodiments provided in the present disclosure. In the optional embodiment, M=4, N=2.

As shown in FIG. 2A, based on step S101, four images comprising a second image 201 are displayed on the interaction interface 200 of the terminal device; then, referring to FIG. 2B, based on step S102, in response to the detection that a first trigger condition is met, the terminal device displays first images in 8 (4×2) regions that have one-to-one correspondence with the 8 images. The 8 images comprise images formed by dividing each of 4 images displayed in FIG. 2A into 2 pieces; next, referring to FIG. 2C, in response to the detection of trigger operations in two regions of the eight regions, the terminal device displays two images 202 and 203 that have one-to-one correspondence with these two regions. Since a second image 201 in FIG. 2A comprises the two images 202 and 203 corresponding to these two regions, the terminal device generates first prompt information indicating that the two images, i.e., the images 202 and 203, can be merged into a second image 201 shown in FIG. 2A.

Figure 3:
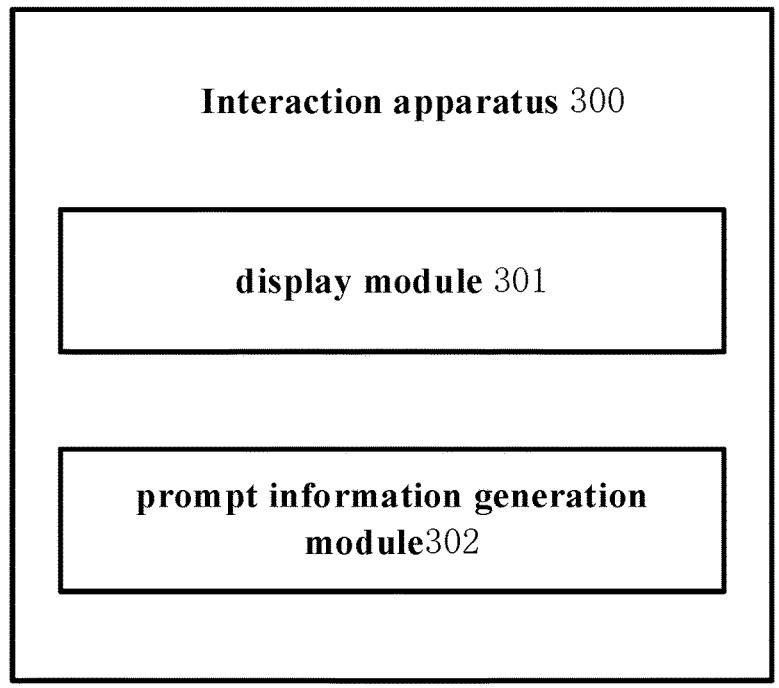
FIG. 3 is a schematic structural diagram of an interaction apparatus provided by some embodiments of the present disclosure.

FIG. 3 is a schematic structural diagram of an interaction apparatus provided by an embodiment of the present disclosure. As shown in FIG. 3, the apparatus 300 comprises: a display module 301 and a prompt information generation module 302.

Wherein, the display module 301 is used for displaying M images, wherein M is a positive integer;

the display module 301 is further used for, in response to the detection that a first trigger condition is met, displaying first images in M×N regions, wherein the M×N regions have one-to-one correspondence with M×N images, the M×N images comprises images formed by dividing each of M images into N pieces, And N is a positive integer greater than 1;

the display module 301 is further used for, in response to the detection of trigger operations in N regions of the M×N regions, displaying, in the N regions, N images that have one-to-one correspondence with the N regions;

the prompt information generation module 302 is used for generating first prompt information, in a case where a second image of the M images comprises the N images.

In some embodiments, the first trigger condition comprises displaying the M images for a first preset duration; or the first trigger condition comprises a trigger operation occurred in a first preset region.

In some embodiments, the display module is further used for displaying Q images, wherein Q is a positive integer greater than M; displaying M images comprises: determining the M images from the Q images in response to the detection that a second trigger condition is met, and displaying the M images.

In some embodiments, the second trigger condition comprises displaying the Q images for a second preset duration; or the second trigger condition comprises a trigger operation occurred in a second preset region.

In some embodiments, determining the M images from the Q images and displaying the M images comprises: determining the M images from the Q images in a random manner and displaying the M images with a first special effect.

In some embodiments, in response to the detection of trigger operations in N regions of the M×N regions, displaying, in the N regions, N images that have one-to-one correspondence with the N regions comprises: each time a trigger operation is detected in one of the N regions, displaying, in the region, an image corresponding to the region.

In some embodiments, displaying, in the N regions, N images that have one-to-one correspondence with the N regions comprises: replacing the first images displayed in the N regions with N images that have one-to-one correspondence with the N regions and displaying the N images.

In some embodiments, the display module 301 is further used for, if a second image of the M images comprises the N images, displaying, in regions other than the N regions of the M×N regions, images that have one-to-one correspondence with these regions.

The apparatus shown in FIG. 3 may execute the method of the embodiment shown in FIG. 1. For the parts not described in detail in these embodiments, reference may be made to the related description of the embodiments shown in FIG. 1. For the execution process and technical effects of the technical solution, reference may be made to the description of the embodiments shown in FIG. 1, which will not be repeated herein.

Figure 4:
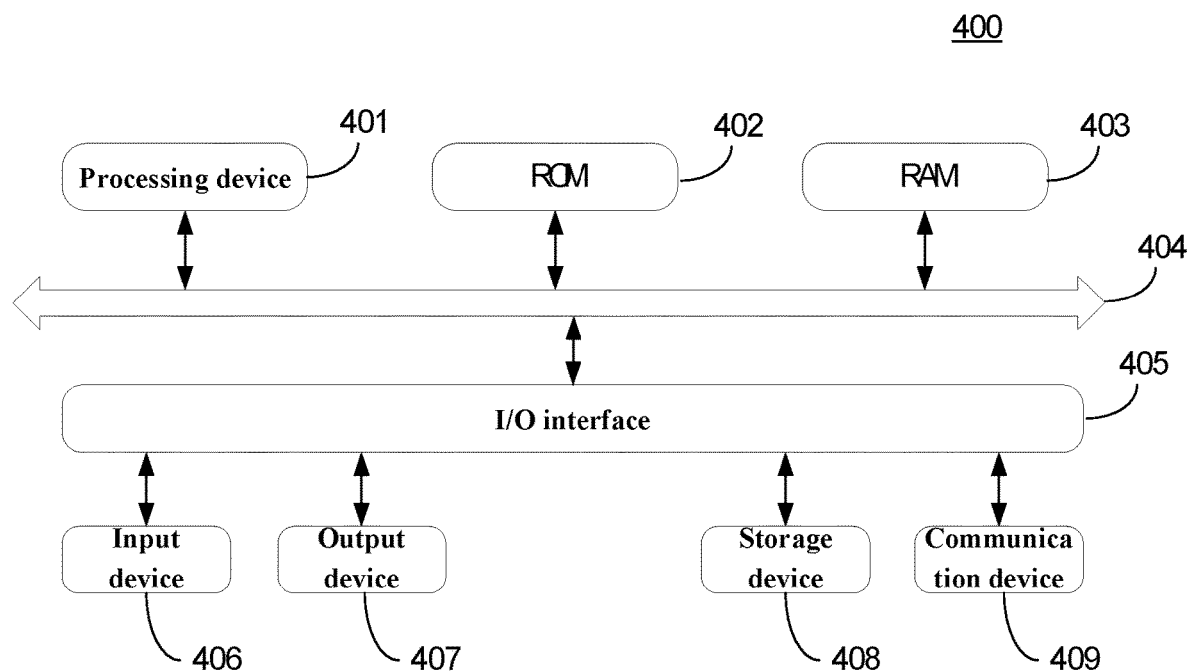
FIG. 4 is a schematic structural diagram of an electronic device provided by some embodiments of the present disclosure.

Referring now to FIG. 4, a structural diagram of an electronic device 400 suitable for implementing embodiments of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 4 is merely an example and should not impose any limitation on the function and scope of the embodiment of the present disclosure.

As shown in FIG. 4, the electronic device 400 may comprise a processing device (e.g., a central processing unit, a graphics processor) 401, which may perform various appropriate actions and processes according to a program stored in Read Only Memory (ROM) 402 or a program loaded from storage device 408 into Random Access Memory (RAM) 403. In RAM 403, various programs and data required for the operation of the electronic device 400 are also stored. Processing device 401, ROM 402 and RAM 403 are connected to each other through communication lines 404. Input/Output (I/O) interface 405 is also connected to the communication lines 404.

Generally, the following devices can be connected to I/O interface 405: input devices 406 comprising, for example, a touch screen, a touch pad, a keyboard, a mouse, a camera, a microphone, an accelerometer, a gyroscope, etc.; output devices 407 comprising a liquid crystal display (LCD), a speaker, a vibrator, etc.; a storage device 408 such as a magnetic tape, a hard disk, etc.; and a communication device 409. The communication device 409 enables the electronic device 400 to communicate wirelessly or wirelessly with other devices to exchange data. Although FIG. 4 shows the electronic device 400 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 409, or installed from the storage device 408, or from the ROM 402. When the computer program is executed by the processing device 401, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to: carry out the interaction method of the above embodiment.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, an electronic device is provided, comprising: at least one processor; and a memory coupled in communication with the at least one processor; wherein the memory stores instructions executable by the at least one processor, the instructions when executed by the at least one processor causing the at least one processor to perform any interaction method in the first aspect of the present application.

According to one or more embodiments of the present disclosure, a non-transitory computer-readable storage medium is provided, characterized in that the non-transitory computer-readable storage medium stores computer instructions used to cause a computer to execute any interaction method in the first aspect of the present application.

According to one or more embodiments of the present disclosure, a computer program is provided, comprising: instructions that, when executed by a processor, cause the processor to implement the interaction method of any embodiment above.

According to one or more embodiments of the present disclosure, a computer program product is provided, comprising instructions that, when executed by a processor, cause the processor to implement the interaction method of any embodiment above.

According to one or more embodiments of the present disclosure, an interaction method is provided, comprising: displaying M images, wherein M is a positive integer; displaying first images in M×N regions, in response to a detection that a first trigger condition is met, wherein the M×N regions have one-to-one correspondence with M×N images, the M×N images comprises images formed by dividing each of M images into N pieces, and N is a positive integer greater than 1; displaying, in L regions of the M×N regions, L images that have one-to-one correspondence with the L regions, in response to a detection of trigger operations in the L regions, wherein L is greater than or equal to N; and generating first prompt information, in a case where N images of the L images form a second image of the M images.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to (but not limited to) those disclosed in the present disclosure.

What is claimed is:

1. A method of displaying images and generating dynamic effects, comprising:
    displaying a plurality of images,
    dividing each of the plurality of images into N parts to generate a plurality of sets of images, wherein N is a positive integer equal to or greater than 2, each of the plurality of sets of images corresponds to one of the plurality of images, and each of the plurality of sets of images comprises N different parts divided from a corresponding image among the plurality of images;
    arranging a plurality of display regions corresponding to images comprised in the plurality of sets of images, wherein the plurality of display regions have one-to-one correspondence with the images in the plurality of sets of images, and a total number of the plurality of display regions is equal to a total number of the images in the plurality of sets of images;
    displaying first images in the plurality of display regions in response to determining that the plurality of images has been displayed for a predetermined time length, wherein the first images are different from the plurality of images;
    replacing first images, in N regions among the plurality of display regions with N images among the images in the plurality of sets of images and displaying the N images in the N regions in response to detecting trigger operations in the N regions;
    determining whether the N images displayed in the N regions comprise N different parts divided from one of the plurality of images; and
    generating a dynamic effect of combining the N images to form the one of the plurality of images in response to determining that the N images in the N regions comprise the N different parts divided from the one of the plurality of images.

2. The method according to claim 1, further comprising displaying Q images before displaying the plurality of images, wherein Q is a positive integer greater than a total number of plurality of images,
    wherein the displaying plurality of images comprises:
    determining the plurality of images from the Q images in response to a detection that a trigger condition is met; and
    displaying the plurality of images.

3. The method according to claim 2, wherein the trigger condition comprises displaying the Q images for a preset duration, or the trigger condition comprises a trigger operation occurred in a preset region.

4. The method according to claim 2, wherein determining the plurality of images from the Q images comprises:
    determining the plurality of images from the Q images in a random manner; and
    displaying the plurality of images comprises:
    displaying the plurality of images with a first special effect.

5. The method according to claim 1, wherein the method comprises:
    displaying, in one region of the N regions, an image corresponding to the one region, in a case where the trigger operation is detected in the one region.

6. The method according to claim 1, further comprises:
    displaying, in regions other than the N regions of the plurality of display regions, images that have one-to-one correspondence with the regions other than the N regions of the plurality of display regions, in a case where the one of the plurality of images comprises the N images.

7. A non-transitory computer-readable storage medium on which computer-readable instructions are stored, which when executed by a computer cause the computer to implement the method according to claim 1.

8. An electronic device, comprising:
    a memory for storing computer-readable instructions; and
    a processor configured to execute the computer-readable instructions, to cause the electronic device to implement operations comprising:
    displaying a plurality of images;
    dividing each of the plurality of images into N parts to generate a plurality of sets of images, wherein N is a positive integer equal to or greater than 2, each of the plurality of sets of images corresponds to one of the plurality of images, and each of the plurality of sets of images comprises N different parts divided from a corresponding image among the plurality of images;
    arranging a plurality of display regions corresponding to images comprised in the plurality of sets of images, wherein the plurality of display regions have one-to-one correspondence with the images in the plurality of sets of images, and a total number of the plurality of display regions is equal to a total number of the images in the plurality of sets of images;
    displaying first images in the plurality of display regions in response to determining that the plurality of images has been displayed for a predetermined time length, wherein the first images are different from the plurality of images;
    replacing first images in N regions among the plurality of display regions with N images among the images in the plurality of sets of images and displaying the N images in the N regions in response to detecting trigger operations in the N regions;
    determining whether the N images displayed in the N regions comprise N different parts divided from one of the plurality of images; and
    generating a dynamic effect of combining the N images to form the one of the plurality of images in response to determining that the N images in the N regions comprise the N different parts divided from the one of the plurality of images.

9. The electronic device according to claim 8, wherein the operations further comprise:
    displaying Q images before displaying the plurality of images, wherein Q is a positive integer greater than a total number of plurality of images;

determining the plurality of images from the Q images in response to a detection that a trigger condition is met; and displaying the plurality of images.

10. The electronic device according to claim 9 wherein the trigger condition comprises displaying the Q images for a preset duration, or the trigger condition comprises a trigger operation occurred in a preset region.

11. The electronic device according to claim 9, wherein the operations further comprise:

determining the plurality of images from the Q images in a random manner; and displaying the plurality of images with a first special effect.

12. The electronic device according to claim 8, wherein the operations further comprise:

displaying, in one region of the N regions region, an image corresponding to the one region, in a case where a trigger operation is detected in the one region.

13. The electronic device according to claim 8, wherein the operations further comprise:

displaying, in regions other than the N regions of the plurality of display regions, images that have one-to-one correspondence with the regions other than the N regions of the plurality of display regions, in a case where the one of the plurality of images comprises the N images.

14. A method of displaying images and generating prompt information, comprising:

displaying a plurality of images;

dividing each of the plurality of images into N parts to generate a plurality of sets of images, wherein N is a positive integer equal to or greater than 2, each of the plurality of sets of images corresponds to one of the plurality of images, and each of the plurality of sets of images comprises N different parts divided from a corresponding image among the plurality of images;

arranging a plurality of display regions corresponding to images comprised in the plurality of sets of images, wherein the plurality of display regions have one-to-one correspondence with the images in the plurality of sets of images, and a total number of the plurality of display regions is equal to a total number of the images in the plurality of sets of images;

displaying first images in the plurality of display regions in response to determining that the plurality of images has been displayed for a predetermined time length, wherein the first images are different from the plurality of images;

displaying, in L regions among the plurality of display regions, L images that have one-to-one correspondence with the L regions in response to detecting trigger operations in the L regions, wherein the L is greater than or equal to N, and the L images are among the images in the plurality of sets of images;

determining whether the L images displayed in the L regions comprises N different parts divided from one of the plurality of images; and generating a dynamic effect of combining the N images to form the one of the plurality of images in response to determining that the L images in the L regions comprise the N different parts divided from the one of the plurality of images.

15. An electronic device, comprising:

a memory for storing computer-readable instructions; and a processor configured to execute the computer-readable instructions, to cause the electronic device to implement the interaction method according to claim 14.

16. A non-transitory computer-readable storage medium on which computer-readable instructions are stored, which when executed by a computer cause the computer to implement the interaction method according to claim 14.

* * * * *